Figures 1, 2:
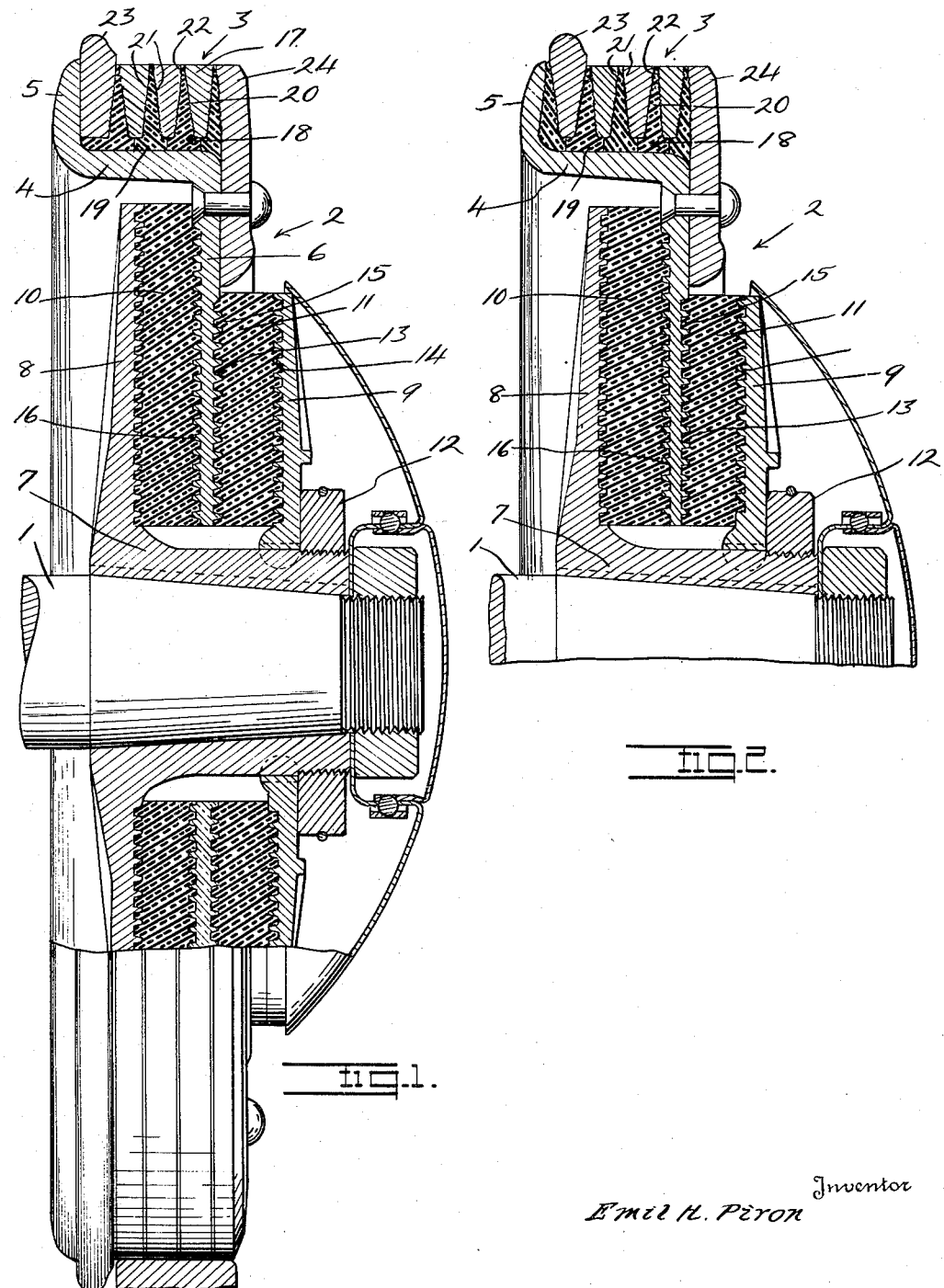

March 10, 1936.  E. H. PIRON  2,033,863

WHEEL

Filed Jan. 9, 1933

Inventor

Emil H. Piron

By Whittemore Hulbert Whittemore Belknap

Attorneys

Patented Mar. 10, 1936

2,033,863

UNITED STATES PATENT OFFICE 2,033,863

WHEEL

Emil H. Piron, Highland Park, Mich., assignor, by mesne assignments, to Transit Research Corporation, New York, N. Y., a corporation of New York Application January 9, 1933, Serial No. 650,921

27 Claims. (Cl. 295—31)

This invention relates to resilient vehicle wheels and has for its object to provide a rim assembly therefor capable of damping vibrations of high frequency and which is particularly suitable for use in conjunction with a wheel such as is described in my copending application Serial Number 648,003, filed December 19th, 1932.

In the art of springing systems and vibration dampers, it is recognized that the most propitious place to damp or alter vibrations resulting from a disturbance is at a point as close to the source of disturbance as possible. In a street car wheel, for example, the vibrations ordinarily transmitted therethrough may be loosely classified as (1) those of large amplitude and low frequency causing substantial vertical displacements and rolling and pitching of the car body and (2) those of small amplitude and high frequency which cause the wheel and rim and other organs of the axle assembly to emit sound and which set up high stresses in the metal. In both cases, it is theoretically desirable to damp the vibrations at the rim as, for instance, by the use of pneumatic tires of great volume. However, practical considerations may render this impractical so that the most feasible approach to this ideal is a springing system involving a plurality of sets of springing devices, part of which are included in the wheel and on the rim and the remainder between the wheel and the car body. In the present instance, damping of vibrations of large amplitude has been delegated in part to a rubber shear suspension between the hub and the rim, as more fully described in the above mentioned copending application. Vibrations of the second class are composed of vibrations due, for instance, to slight irregularities in the wheel contacting surfaces of the rails, to slight imperfections in the roundness of the wheels, to impacts at rail crossovers, rail joints and switches, and to side thrust against the rail during nosing of the vehicle and while rounding a curve. Under such conditions, ordinary rims and wheels vibrate at high frequency. Since these high frequency vibrations generally entail a very small actual displacement of the wheel rim or tire, it is feasible to damp them at their source and it is with such damping that the present invention is more particularly concerned.

I am aware of numerous suggestions and attempts to prevent transmission of high frequency vibrations generated at the rim to the remainder of the wheel. The primary object of the present invention, however, is to reduce the generation of high frequency oscillations and especially those of audible frequency at the rim and also to damp the oscillations which may be there generated. In other words, it is my purpose to reduce the natural oscillating frequency of the rim and to promptly damp such oscillations as occur.

I therefore provide what may be called either a novel tire assembly for the rim or a sound insulated multiple rim assembly, the outer or rail contacting surface of which is composed of a plurality of metallic elements insulated each from each, so to minimize the metallic mass capable of vibrating in concert and I then provide means for confining and damping the vibrations of these small masses in addition to damping such of these vibrations as may find the rim proper.

If a metallic wheel be encircled with rubber and a metallic tire or rail contacting member be supported by the rubber and secured thereto as by vulcanizing, in operation, that part of the rubber below a horizontal plane through the axis of the wheel is under compression while that part above the plane is under tension. In passing from tension to compression as the wheel rotates there is a local crowding of the rubber at constantly shifting areas and a decided tendency for the rubber to creep which causes the bond to become broken, first in spots and then over larger areas, and which, in turn causes a destruction of the rubber by friction thereof with the metallic surfaces as actual creepage thereupon occurs. It is therefore another object of this invention to provide a resilient tire or rim of long life by arranging the rubber damping elements in such manner as to obviate this creepage. More specifically, it is an object to provide a resilient wheel employing rubber between a metallic rail contacting portion thereof and the remainder of the wheel, and to impose a continuous pressure on the rubber of such magnitude that there can be no actual tension on any portion of the rubber, including that portion diametrically opposite the point of contact of the wheel with the rail.

It is a further object to employ a pressure, as described above, of such magnitude as may be employed as a means for setting up a frictional lock between the rubber, the rail contacting means and the rim proper and hence be of such magnitude as will preclude the relative slippage or circumferential displacement of these elements during the operation of the wheel.

It is a further object to provide a rim assembly including a rim portion, a cushioning element and a plurality of metallic rail contacting members each embedded therein, these members being freely assembled without cementing or other bonding, and to provide a yieldable retaining member for imposing high pressure on the rubber for the purposes mentioned, the retaining member being removable to permit dismantling of the rim assembly and hence replacement of any worn or damaged part without the necessity for specialized knowledge or equipment and with the loss of but little time.

Another object of the invention is to provide a tire composed of a plurality of metallic rings each individually embedded in rubber, and to so construct the rings that they will maintain their shape regardless of the severity of service to which they may be put, it being contemplated that a single ring may be called upon to encounter a sudden shock and of itself transmit the shock to the wheel without benefit of assistance from other rings.

When a conventional wheel encounters an irregularity in the track, as, for instance, a rail joint, the wheel may be thrown past the irregularity by a sufficient amount to cause loss of adhesion with the rail until regaining pressure contact therewith and a consequent spinning of the wheel by its motor results. When the wheel thereafter finds good adhesion a severe impact between the rail and the wheel results, thus causing severe stresses and local wear. It is common knowledge that local wear on the rails is far in excess of and a far more serious item than general rail wear, so that it is another and important object of this invention to provide a wheel capable of improved adhesion with the rail.

Whether or not the wheel will lose contact with the rail immediately beyond the irregularity depends, among other things, upon the unsprung mass of the parts affected. Since this invention relates to wheels, track problems are only incidental to the discussion, so that the magnitude of track irregularities is beyond control. The solution of the problem is thus broadly dependent upon a reduction in the mass affected, and more particularly and more importantly upon a reduction in the unsprung weight of the wheel. As will be seen hereinafter, I accomplish this by providing a multi-part tire and by supporting each part independently from a rim through resilient cushioning elements.

Other objects and advantages will become hereinafter more fully apparent as reference is had to the accompanying drawing, wherein my invention is illustrated, by way of example, and in which Figure 1 is a transverse section through a wheel, in accordance with my invention;

Figure 2 is a view similar to Figure 1, showing a modified construction.

Referring to Figure 1, 1 is the axle of the vehicle which, in the present instance, is a street car and 2 is the wheel which is mounted upon and driven with the axle. 3 is the tire assembly of the wheel and 4 is the cylindrical rim member for receiving the tire assembly and provided with the integral radially outwardly extending flange or fixed ring or side member 5.

For the purpose of damping vibrations of large amplitude and low frequency ordinarily transmitted through the wheel, the wheel is so formed, as described more in detail in my co-pending application Serial Number 648,003 filed December 19th, 1932, that it has a rubber shear suspension between the hub and rim member. In the present instance, the wheel has the plate 6 which is preferably integral with the rim member and extends radially inwardly therefrom. The wheel also has the hub 7 which is mounted on the axle and keyed thereto and which has the radially outwardly extending fixed flange or plate 8 at its inboard end and the radially outwardly extending plate 9 at its outboard end, the latter being non-rotatable relative to the hub but adapted to move axially thereof.

The plate 6 is received between the plates 8 and 9 and embedded in a mass of rubber. More particularly, 10 and 11 are rings or annular blocks of rubber arranged between the plate 6 and the plates 8 and 9 respectively. For urging the plates 9 and 6 and the rings 11 and 10 toward the plate 8 and imposing pressure upon the rings, I have provided the retaining means 12 in the form of a nut circumscribing and threaded upon the outboard end of the hub and abutting the plate 9.

The surfaces of the rings 10 and 11 perpendicular to the wheel axis are relatively large and are entirely or completely in contact with the plates 6, 8 and 9. These plates are forced toward each other and maintained in position to impose a substantial and continuous pressure upon the rings of sufficient magnitude to set up a frictional lock against slippage of the rings relative to the plate under normal operation of the wheel. In operation, the rings are subjected to loading in a radial direction by the car weight, vertical irregularities of the track and so forth, and to loadings of a tangential character by driving and braking forces. The forces producing these loadings are in a direction substantially normal to the direction of the clamping force imposed by the nut 12 and the rings are thus subjected to pure shear stresses by the radial and tangential forces The angularity or direction of the shear load deflection curve for vertical motion is dependent, among other things, upon the softness and the thickness of the rings of rubber 10 and 11 and upon the provision of a perfect shear resisting condition for the entire surfaces thereof. To obtain maximum resiliency, the rubber should be as soft and as thick as possible, when in compressed position, in order that there may not be an undue restriction of movement. On the other hand, there is a limit to the extent to which these requirements may be carried, because of the increasing heating and ultimate destruction of the rubber, if an unduly large degree of resiliency is provided. The proper amount of transverse resiliency is also dependent upon the softness and the thickness of the rings of rubber and further upon a proper distribution of the loading in a transverse direction. The softness and the thickness of the rings is such that when they are subjected to pure compression stresses, as controlled by the nut 12, they provide for the proper relative movement of the rim and the hub, both vertically and transversely or axially of the wheel. In any case, the rubber compound must be carefully chosen, an example being a rubber compound containing 9 to 15 per cent of zinc oxide and the necessary amount of gas black to give a hardness of 35 to 50 degrees, as measured by a durometer, and also the necessary amount of sulphur and other ingredients required for the curing. In any event, the pressure upon the rings, as controlled by the nut, is sufficient to obviate slippage of any constituent part, but an increased pressure may be selected by adjusting the nut to secure a smaller amount of transverse resiliency.

The following has been found suitable for a street car wheel of conventional over-all diameter, if the wheel is to be given a total load of 3000 pounds when the car is empty and 5000 pounds when the car is fully loaded. 400 square inches of rubber surface are used in shear and each ring of rubber is one inch thick and placed under a continuous average compression of 50 pounds per square inch. The shearing force on the rubber under 5000 pounds car load is 12.5 pounds per square inch. The coefficient of friction of rubber and steel parts pressed together is approximately 0.5. Thus a compression of 25 pounds per square inch is required to provide the necessary friction and the friction obtained by a compression of 50 pounds per square inch is twice as great as necessary for normal loading, which represents the factor of safety.

While the rings of rubber 10 and 11 are effectively secured to the plates 6, 8 and 9 by a pressure providing a safety factor, the safety factor may be increased by vulcanizing the rings to the plates or by other bonding means. An abnormal or accidental loading, such as, for instance, as when a street car is derailed, renders such further safety factor desirable. This additional safety factor is provided by forming the loaded plate 6 and the loading plates 8 and 9 with the series of circular grooves 13 and 14 respectively which are concentric with the axis of the hub or axle and by also forming the series of circular concentric interfitting ribs 15 in the rings of rubber 10 and 11. The grooves and the ribs may extend substantially over the entire or complete contacting surfaces of the plates and the rings of rubber and, inasmuch as the strength of the metal of the plates is greater than that of the rubber of the rings, the ribs 16 intermediate the grooves 13 and 14 in the plates may be considerably less in thickness than the ribs 15 on the rings. I also preferably impart to the ribs 16 a tapering form as they extend from the bodies of the plates toward the rings, so as to form the grooves 13 and 14 with flaring sides for receiving the correspondingly tapered ribs 15.

For the purpose of reducing the generation of and damping the vibrations of small amplitude and high frequency and especially the oscillations of audible frequency and more particularly to reduce the generation of and damp these vibrations or oscillations at their sources, I have provided the following construction of tire assembly for the rim or sound insulated multiple rim assembly. The tire is formed of the plurality of metal rings 17 which constitute wear elements having their outer surfaces adapted to contact with the rail. These rings are constructed to resist local distortion, regardless of the severity of service to which they may be subjected, it being contemplated that a single ring may be called upon to transmit a sudden shock to the wheel without assistance from other rings. In the present instance, these rings are formed of special alloy steel having a very high yield point and very high tensile strength as a safeguard against fracture.

Each of these rings is individually embedded in rubber encircling the rim member 4 and hence sound-insulated from each other. More particularly, the mass of rubber in which the rings are embedded is formed of the plurality of rubber rings 18 having the base portions 19 located between the rim member 4 and the inner surfaces of the rings 17 and the radially outwardly extending portions 20 located at the sides of and between the rings 17. The metal rings are preferably trapezoidal in cross section, but numerous other shapes, as triangular, would serve. The major portions 21 of the sides of each are preferably serrated and arranged to converge toward each other in a radially inward direction to the inner surface. In addition, the sides of each ring have the smooth or plain portions 22 radially outwardly beyond the portions 21 and extending substantially parallel to each other and at right angles to the axis of the wheel, the widths of the spaces between these portions 22 being restricted to prevent the radially outward flow of rubber therethrough.

23 is the metal ring of greater outside diameter than the rings 17 and constituting the wheel flange. This ring 23 encircles the rim member 4 at the outboard side of the flange or ring 5 and is also supported by the mass of rubber encircling the rim member. Furthermore, the outboard side of the ring 23 which contacts with rubber is formed in the same manner as the outboard sides of a ring 17.

24 is the metal side member or clamping ring for urging the metal and rubber rings toward the flange or ring 5 and imposing a continuous pressure on the rubber of such magnitude that the rubber is at all times under compression. The inboard side of this side member or clamping ring is formed in the same manner as the inboard side of a ring 17.

A slight vertical displacement of one or more of the rings occurs under loading, but the compression imposed on the rubber by the ring 24 is of such magnitude that even at a region diametrically opposed to the point of rail contact there can be no actual tension in the rubber at any time. The strength and springiness of the ring 24 is such that, during vertical displacement of one or more rings, the rubber will be forced to flow and hence to follow the regional widening of the gap between the rim proper and a ring. Also, since the pressure exerted by the side member or clamping ring has effect over the vastly major portion of the cross sectional area of each ring 17, each ring may transmit that portion of the weight of the car to be carried by the wheel and also a sudden shock without benefit of assistance from the other rings, without subjecting any portion of the rubber to tension. Furthermore, the continuous pressure on the rubber is of such magnitude that a frictional lock is set up between the entire contacting surfaces of the rubber, the metal rings and the rim member, irrespective of the constant shifting of the point of loading on the rubber during the normal operation of the wheel, so that relative slippage or circumferential displacement of these elements is precluded.

The reduction of that rail and wheel wear which results from impacts between the two is very important and since this wear is a function of the kinetic energy of the unsprung mass represented by $\frac{1}{2}mv^2$ in which $m$ is the unsprung mass, it is very important to reduce the unsprung weight of the wheel assembly to as great an extent as possible. With my construction, the rim is composed of a plurality of metallic elements 17 insulated from each other and independently supported from the rim member 4 by a resilient cushioning element or mass of rubber so that these rings constitute the entire unsprung weight of the wheel. As a result, the wheel is capable of improved adhesion with the rail and wear of both the rail and wheel is materially reduced.

The construction of the rim assembly is such that the metallic rail contacting members are embedded in the resilient cushioning element or mass of rubber and frictionally locked therewith without cement or other bond, so that the rim assembly may be dismantled to provide for replacement of any worn or damaged part. While I have shown the ring 24 as being riveted to the rim proper, this does not preclude ready disassembly, since it is rather an easy matter to shear the heads of these rivets, as by the use of a pneumatic chisel. Bolts may be used if preferred. Furthermore, the metal rings of the rim assembly may be worn or ground off and trued to quite an extent without exposing any additional surface of rubber by reason of the rings being provided with the substantially parallel radially outer side portions.

Figure 2 shows a modification in which the same general arrangement of parts, as shown in Figure 1, is present, with the exception that the metallic ring 23 which forms the wheel flange is completely mounted in rubber.

What I claim as my invention is:

1. In a wheel, a rim member, a mass of rubber encircling said rim member, and a plurality of metallic rings encircling said rim in spaced relation therewith, said rings each being embedded in said rubber and constituting wear elements, said rings each having a base portion constituting the wear surface and side walls converging toward the center of the wheel, said rings being in close proximity to each other whereby said side walls may resist the tendency of said rubber to flow therepast during loading.

2. In a wheel, a rim member, a mass of rubber encircling said rim member, a plurality of metallic rings of substantially trapezoidal cross section surrounding said rim in spaced relation therewith and embedded in said rubber as wear elements, and retaining means for said rubber laterally of said rim member, said retaining means maintaining said rubber under a continuous compression.

3. In a wheel, a rim member, a mass of rubber encircling said rim member, a plurality of metallic rings of substantially trapezoidal cross section surrounding said rim in spaced relation therewith and embedded in said rubber as wear elements, and retaining means for said rubber laterally of said rim member, said retaining means imposing a continuous compression on said rubber of sufficient magnitude to constitute a frictional lock between said rubber and said rings over their entire contacting surfaces irrespective of the constant shifting of the point of loading on said rubber by said wheel during operation.

4. In a wheel, a rim having a flange, a mass of rubber encircling said rim laterally of said flange, a plurality of metallic rings of substantially trapezoidal cross section surrounding said rim, the larger base of the trapezoid of each ring constituting the wear face thereof, the other sides of said trapezoids being submerged in said rubber and corrugated to increase the area of contact therewith, and a retaining ring for said rubber secured to said rim at the side thereof opposite said flange, said retaining ring when in position exerting a pressure on said rubber of sufficient magnitude to effect a frictional locking engagement of said rubber with said rings and said rim member circumferentially thereof irrespective of the shifting point of contact of the wheel with a rail.

5. In combination in a wheel, a rim member, a mass of rubber encircling said rim member, a metallic tire element supported by said rubber and a rail contacting flange element supported by said rubber in spaced relation with said tire element.

6. In a wheel, a rim member, a mass of rubber encircling said rim member, a plurality of metallic rings surrounding said rim member and individually embedded in said rubber as rail contacting elements, and a further ring member of greater outside diameter than the first named rings also supported by said rubber, said further ring member constituting a rail flange.

7. In a wheel, a rim member having a flange integral therewith, a mass of rubber encircling said rim member, a plurality of spaced metallic rings surrounding said rim member and individually embedded in said rubber as rail contacting elements, a further ring of greater diameter than the first named rings also supported by said rubber and constituting a wheel flange, said further ring being spaced from said first named rings and having rubbing contact with the flange integral with said rim member.

8. In combination in a wheel, a rim member, a mass of rubber encircling said rim member, and a plurality of metallic rings individually embedded in said rubber, said rings each being of substantially trapezoidal shape and having parallel sides near the outer periphery thereof whereby the rail contacting surfaces may be refinished without exposing additional rubber, said rings each being resistant to local deformation under impact and of high tensile strength as a safeguard against fracture.

9. In combination in a wheel, a hub, a rim member resiliently supported from said hub and capable of substantial relative movement with respect thereto, a multi-part metallic tire for said rim member and a mass of rubber resiliently supporting each individual part of said tire from said rim member in compression and shear, one of said parts comprising a rail contacting flange member in direct engagement with an interior side wall of said rim member.

10. In combination in a wheel, a hub, a rim member supported from said hub in resilient shear, a mass of rubber encircling said rim member, a plurality of metallic rings constituting wear elements individually embedded in said rubber and a rail flange also spaced from said rings and supported by said rubber.

11. In a wheel, a rim member, a mass of rubber encircling said rim member, a plurality of metallic rings constituting rail contacting elements and a further ring member of greater outside diameter than said first named rings and rim member and all said rings surrounding said rim member and being individually embedded in said rubber and insulated from each other and said rim member.

12. In combination in a wheel for a rail vehicle, a wheel rim element, a rim member comprising a plurality of parallel wearing elastic means interposed directly therebetween forming a tread surface and a rail contacting flange around said element, means for maintaining said wearing means in spaced relationship and resilient means for supporting all of said wearing means and said flange from said rim member.

13. In a wheel for rail vehicles, a tire supporting rim member, a plurality of rings of rubber carried by said rim member, a plurality of circular metallic elements which when in assembly between said rubber rings constitute a tire and rail contacting flange supported by said rubber and means for imposing a continuous pressure laterally of the wheel to maintain said rubber under compression against said metallic elements.

14. In combination, in a wheel for rail vehicles, a plurality of rail contacting ring members, one of which comprises a rail contacting flange, and elastic means individually supporting each of said ring members, said elastic means substantially covering at least two surfaces of each of said rings.

15. In combination, in a wheel for rail vehicles, a plurality of substantially flat-sided rail contacting ring members, one of which comprises a rail contacting flange, and rubber cushioning elements separating said ring members, said rubber elements overlying substantially the entire vertical sides of each of said ring members.

16. In combination, in a wheel for rail vehicles, a plurality of rail contacting ring members, one of which comprises a rail contacting flange, rubber cushioning means supporting each of said ring members, and rubber separating said ring members as a sound deadening means.

17. In combination, in a wheel for rail vehicles, a hub, a plurality of metallic rail contacting rings, one of which comprises a rail contacting flange, rubber ring members separating said metallic rings, means for supporting said metallic rings from said hub, and rubber between said means and said metallic rings, said rubber covering substantially the entire opposed surfaces of said metallic rings.

18. The combination in a rail wheel having a rail contacting flange, of a plurality of metallic ring members comprising a rail tread surface, and an elastic medium separating and supporting said ring members for individual deflection and extending outwardly substantially to the tread surface thereof.

19. As an article of manufacture, a tire for car wheels comprising a series of metal rings arranged side by side and constituting the main tread for a wheel, said metal rings being spaced apart and rings of rubber filling the intervening spaces and cured to the metal rings.

20. As an article of manufacture, a tire for car wheels comprising a series of metal rings arranged side by side and constituting the main tread for a wheel, said metal rings being spaced apart and rings of rubber filling the intervening spaces and cured to the metal rings, one of the end-most metal rings projecting peripherally beyond the others and shaped to constitute a wheel flange and the outer peripheral surfaces of the other rings constituting the thread for a wheel.

21. A car wheel comprising a main member having a circular peripheral channel, a series of metal rings arranged side by side concentrically with said channel and spaced apart, and rubber interposed between adjacent metal rings and between the endmost metal rings and the sides of said channel, and constituting means for resiliently holding said metal rings in position, said metal rings extending peripherally beyond said channel to constitute the main tread of the wheel and the inner peripheral surfaces of said metal rings being spaced outwardly beyond the bottom of said channel whereby said rings are individually radially movable to a limited extent.

22. A car wheel comprising a main member having a circular peripheral channel, a series of metal rings arranged side by side concentrically with said channel and spaced apart therein, and rubber interposed between adjacent metal rings and between the endmost metal rings and the sides of said channel and constituting means for resiliently holding said metal rings in position, said metal rings extending peripherally beyond said channel to constitute the main tread of the wheel and the inner peripheral surfaces of said rings being spaced outwardly beyond the bottom of said channel whereby said rings are individually radially movable to a limited extent, one of the endmost metal rings projecting peripherally beyond the others to constitute a wheel flange and the outer peripheral surfaces of the other rings constituting the tread of the wheel.

23. A car wheel comprising a main member having a circular peripheral channel, a plurality of axially alined metal rings disposed in said channel and providing the main tread of the wheel and rubber between the respective metal rings and between the endmost rings and the sides of the channel and between the inner surfaces of the metal rings and the bottom of the channel, the rubber constituting resilient means for bonding the metal rings together and to said channel whereby said rings are individually radially movable to a limited extent.

24. A car wheel comprising a main metal member having a circular peripheral channel, a tire comprising a plurality of metal rings disposed side by side in said channel and providing the main tread of the wheel, and rubber between adjacent metal rings and between the inner surfaces of the metal rings and bottom of the channel, said rubber being cured to the surfaces against which it contacts and constituting means for resiliently holding said metal rings while permitting sufficient radial movement thereof to let their tread surfaces conform to the rail head.

25. As an article of manufacture, a tire for car wheels comprising a series of metal rings arranged side by side and constituting the main tread for a wheel, said metal rings being spaced apart and rings of rubber filling the intervening spaces and operatively attached to the metal rings.

26. As an article of manufacture, a tire for car wheels comprising a series of metal rings arranged side by side and constituting the main tread for a wheel, said metal rings being spaced apart and rings of rubber filling the intervening spaces and operatively attached to the metal rings, one of the endmost metal rings projecting peripherally beyond the others and shaped to constitute a wheel flange and the outer peripheral surfaces of the other rings constituting the tread for a wheel.

27. A car wheel comprising a main metal member having a circular peripheral channel, a tire comprising a plurality of metal rings disposed side by side in said channel and providing the main tread of the wheel, and rubber between adjacent metal rings and between the endmost metal rings and the sides of the channel and between the inner surfaces of the metal rings and bottom of the channel, said rubber being operatively attached to the surfaces against which it contacts and constituting means for resiliently holding said metal rings while permitting sufficient radial movement thereof to let their tread surfaces conform to the rail head.

EMIL H. PIRON.